(12) United States Patent
Iwasawa

(10) Patent No.: US 7,164,119 B2
(45) Date of Patent: Jan. 16, 2007

(54) SECURITY SENSOR SYSTEM

(75) Inventor: Masashi Iwasawa, Otsu (JP)

(73) Assignee: Optex Co., Ltd., Shiga (JP)

( * ) Notice: Subject to any disclaimer, the term of this patent is extended or adjusted under 35 U.S.C. 154(b) by 0 days.

(21) Appl. No.: 11/189,716

(22) Filed: Jul. 27, 2005

(65) Prior Publication Data

US 2006/0022120 A1 Feb. 2, 2006

(30) Foreign Application Priority Data

Jul. 28, 2004 (JP) ............... 2004-219562

(51) Int. Cl.
*G08B 13/18* (2006.01)
(52) U.S. Cl. ............. 250/221; 250/205; 250/341.1; 340/545.3; 340/555
(58) Field of Classification Search ......... 250/221, 250/222.1, 205, 341.1; 340/545.3, 555–557
See application file for complete search history.

(56) References Cited

U.S. PATENT DOCUMENTS 5,596,310 A 1/1997 Itoh 6,714,131 B1 * 3/2004 Iwasawa et al. .......... 340/556
6,998,982 B1 * 2/2006 Iwasawa ................. 340/545.3
2004/0113779 A1 6/2004 Iwasawa

FOREIGN PATENT DOCUMENTS

EP 0 466 522 A1 1/1992
JP 2002-367045 A 12/2002

* cited by examiner

*Primary Examiner*—Kevin Pyo
(74) *Attorney, Agent, or Firm*—Sughrue Mion, PLLC

(57) ABSTRACT

A security sensor system includes beam projecting and receiving units (1) and (2). The proper range of the received beam level is adjusted with change in time of the received beam level so that in the case that the received beam level departs from the proper range, the amount of beam projected from the beam projecting unit (1) can be adjusted to enable the received beam level to fall within the proper range. The unit (2) includes a received beam level detector (27), a level setting circuit (28) for setting a proper range of the received beam level, a request signal output circuit (30) for outputting a request signal requesting an adjustment of the amount of beam, and a transmitter (33) for transmitting the request signal to the unit (1). The unit (1) includes a beam projecting power adjustor (15) operable in response to the request signal.

4 Claims, 3 Drawing Sheets

SECURITY SENSOR SYSTEM

BACKGROUND OF THE INVENTION

1. Field of the Invention

The present invention generally relates to a security sensor system, including a beam projecting unit for projecting a sensing beam such as an infrared beam and a beam receiving unit for receiving the sensing beam, in which the presence or absence of an object such as a human body when the object intercepts the sensing beam is detected.

2. Description of the Prior Art

As is well known to those skilled in the art, this type of security sensor system generally includes a beam projecting unit having a beam projector for projecting a sensing beam such as an infrared beam and a beam receiving unit having a beam receiver optically aligned with the beam projector for receiving the sensing beam. An area between the beam projector and the beam receiver is defined as an alert area of a rectilinear distance, which may extend from a few meters to a few hundred meters. When an unauthorized person enters the alert area and intercepts the sensing beam, the detection is made.

In order for the security sensor system to work satisfactorily, it has hitherto been well known in the art to provide the beam projecting unit with an optical power adjustor for adjusting the beam projecting power of the beam projector to keep the sensing beam at a constant level of power in dependence on the level of light (sensing beam) received by the beam receiver, so that the beam receiver may receive a proper amount of the sensing beam at all times. According to this known security sensor system, such adjustment of the beam projecting power of the beam projector is carried out during the installation or maintenance of the system to align the respective optical axes of the beam projector and receiver. See, for example, the Japanese Laid-open Patent Publication No. 2002-367045.

On the other hand, it has often been observed that the level of light received by the beam receiver varies considerably with passage of time under the influence of external environment. By way of example, when it rains or snows, or when mist hangs in the air, the level of light received by the beam receiver attenuates as shown in FIG. 4. In order for the security sensor system to be substantially immune from such an influence, it is a general practice to set the beam projecting power of the beam projector to a rather higher value than a predetermined or required level.

It has, however, been found that if the beam projecting power is set to the higher value than the required level, the security sensor system may not work satisfactorily. More specifically, when the rain or snow clears up, a rain-soaked ground surface or a mantle of snow reflects the sensing beam, causing the beam receiver to receive the reflected sensing beam out of the path of the sensing beam traveling from the beam projector towards the beam receiver. Once this occurs, the security sensor system may fail to detect an unauthorized entry of a person within the alert area and to emit the warning signal, even though the person entering the alert area intercepts the sensing beam.

Also, when the security sensor system is installed in the vicinity of the wall, an effect similar to that described above may occur as the wall reflects the sensing beam out of the path.

Accordingly, the prior art security sensor system must be installed distant from the ground surface or the mantle of snow or the building wall, and the place of installation of the device is thus limited. Also, unless the beam receiver is set to a proper beam receiving level, a false warning signal may be likely to occur.

On the other hand, in order for an electric analog signal of a high level to be converted into a digital signal with an analog-to-digital (A/D) converter, used in the beam receiving unit to detect the beam receiving level, without being accompanied by an over-range, the A/D converter must have an input voltage range that is sufficiently broad. However, setting the broad input voltage range reduces the resolving power, worsening the detecting accuracy of the light receiving level. Also, while the automatic gain control (AGC) is often applied to an amplifier circuit employed in the beam receiving unit to secure an input dynamic range of the A/D converter, the application of the automatic gain control tends to make the beam receiving unit to be unable to achieve an accurate detection of the beam level such as weak input, strong input or reflected beam.

SUMMARY OF THE INVENTION

The present invention has been devised to substantially eliminate the foregoing problems and inconveniences inherent in the prior art security sensor system and is intended to provide an improved security sensor system, which is substantially free from the influence by an external environment and the limitation of the place of installation, which is effective to maintain the beam receiving level of a beam receiver at a proper level to avoid failure to generate a warning signal and also to avoid generation of an erroneous warning signal, and in which the detecting accuracy of the beam receiving level is increased.

In order to accomplish the foregoing object, the present invention provides a security sensor system for detecting an object when the latter intercepts passage of a sensing beam, which system includes a beam projecting unit including a beam projector for projecting the sensing beam and a drive circuit for driving the beam projector, and a beam receiving unit including a beam receiver for receiving the sensing beam. The beam receiving unit also includes a received beam level detector for detecting a level of the sensing beam received, a level setting circuit for setting a proper range of the received beam level, a request signal output circuit for outputting a request signal requesting an adjustment of an amount of the sensing beam projected from the beam projector in the case that the received beam level departs from the proper range, and a transmitter for transmitting the request signal to the beam projecting unit. On the other hand, the beam projecting unit also includes a beam projecting power adjustor operable in response to the request signal from the beam receiving unit to drive the drive circuit to thereby adjust an amount of the sensing beam, projected from the beam projector, so that the received beam level can fall within the proper range.

According to the present invention, the proper range of the received beam level is adjusted with change in time of the received beam level and in the case that the received beam level departs from the proper range, the amount of the beam projected from the beam projector is adjusted so that the received beam level falls within the proper range. Accordingly, even though the external environment changes with time, the received beam level can fall within the proper range so adjusted with the change of the external environment and, therefore, at all times during the operation of the system, the proper received beam level can be maintained without being adversely affected by the external environment and, also, without any limitation imposed on the place of installation, thus eliminating a possible failure to generate a warning signal or a possible generation of an erroneous warning signal. Also, since the adjustment of the amount of the projected beam lowers the peak value of the received beam level and, hence, the dynamic range of the A/D converter used for the detection of the received beam level can be increased, resulting in increase of the resolving power and also the accuracy of detection of the received beam level.

In a preferred embodiment of the present invention, the security sensor system may also include a proper range adjustor for adjusting the proper range with change in time of the received beam level. The proper range adjustor automatically adjusts the proper range based on, for example, an average value of the received beam level every predetermined time width. The use of the proper range adjustor is effective to further accurately adjust the proper range. The automatic adjustment of the proper range can be readily accomplished if the proper range adjustor includes an average value calculator for calculating the average value of the received beam level and a level width setting circuit for setting a predetermined level width, corresponding to the proper range, with the average value taken as a center value.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
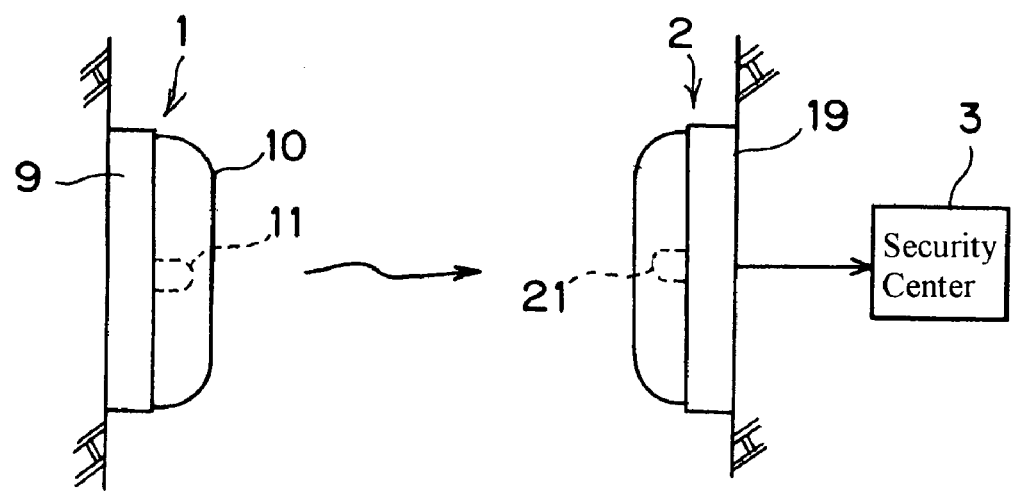
FIG. 1 is a side view of a security sensor system according to a preferred embodiment of the present invention.

Hereinafter, a preferred embodiment of the present invention will be described in detail with reference to the accompanying drawings. Referring to FIG. 1, a security sensor system of the present invention includes beam projecting and receiving units 1 and 2 spacedly positioned on respective sides of a rectilinear alert area defined between the beam projecting and receiving units 1 and 2. The beam projecting and receiving units 1 and 2 are supported by a support surface, for example, a building wall or a pole. The beam projecting unit 1 includes a beam projector 11 for projecting a sensing beam such as an infrared beam. The beam receiving unit 2 includes a beam receiver 21 for receiving the infrared beam IR emitted from the beam projector 11.

The beam projecting unit 1 also includes a projector base 9, through which the beam projecting unit 1 can be secured to the support surface, and a projector cover 10 for covering the base 9 and protecting the beam projector 11. Similarly, the beam receiving unit 2 also includes a receiver base 19, through which the beam receiving unit 2 is secured to the support surface, and a receiver cover 20 for covering the base 19 and protecting the beam receiver 21. The security sensor system of the present invention is operable to detect an object such as a human body into the alert area when the object intercepts the path of the infrared beam IR traveling from the beam projector 11 towards the beam receiver 21 and is capable of adjusting the beam projecting power of the infrared beam IR emitted from the beam projector 11 (the beam receiving power of the beam receiver 21) to a proper value at all times, without being substantially affected by an external environment.

Figure 2:
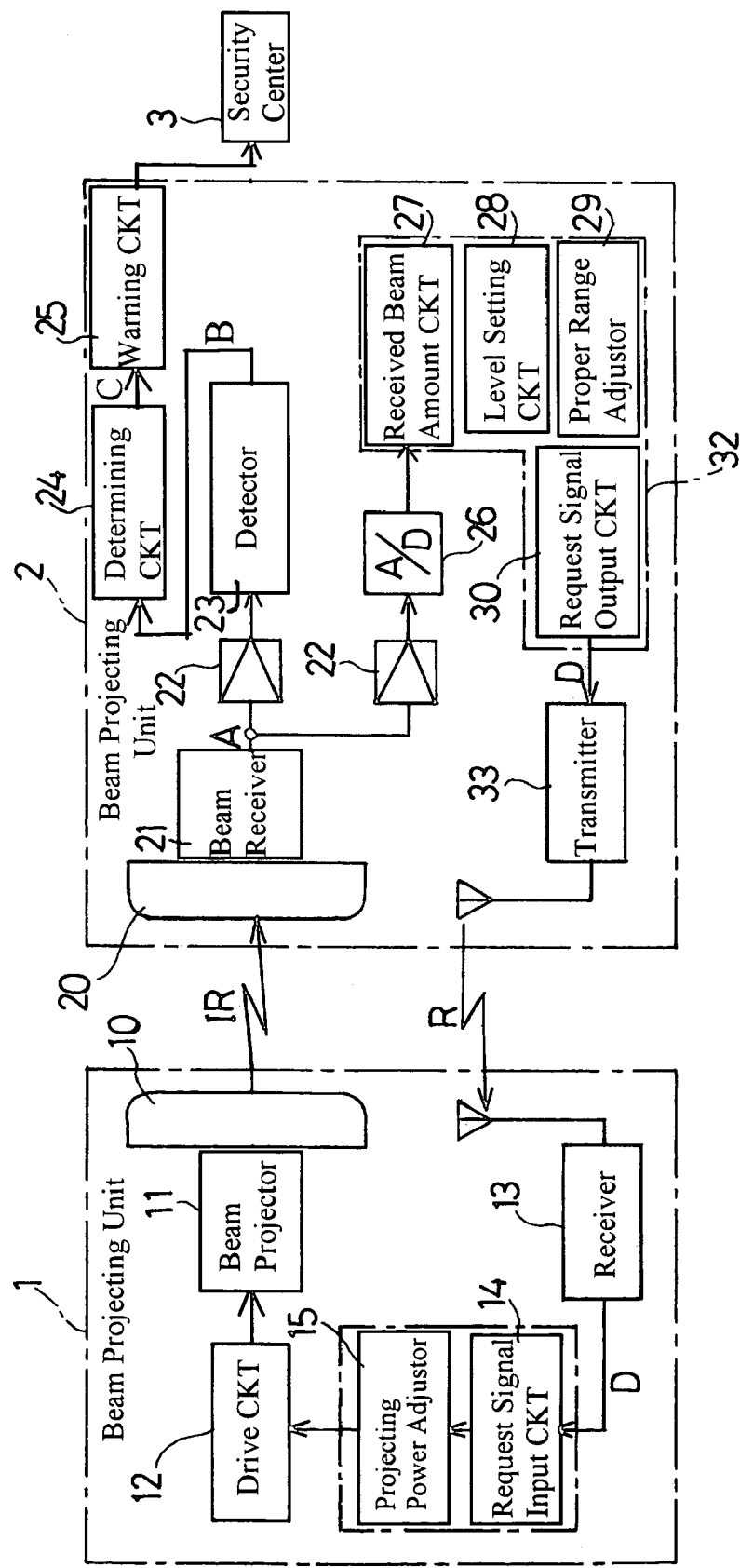
FIG. 2 is a block diagram showing an electric circuit employed in the security sensor system shown in FIG. 1.

The security sensor system has an electric circuitry such as shown in FIG. 2. The beam projecting unit 1 includes the beam projector 11, which is provided with a beam projecting element (not shown) such as an infrared emitting diode and a transmitter optical system (not shown) made up of, for example, a projector lens or a reflecting mirror for forming the infrared beam IR, and a drive circuit 12 for driving the beam projector 11. The beam projecting unit 11 also includes an optical axis adjusting mechanism (not shown) for aligning the optical axis between the beam projector 11 and the beam receiver 21 by manually turning the beam projecting element and the transmitter optical system. When the beam projecting element is driven at a predetermined frequency by the drive circuit 12 to project the infrared beam IR, the infrared beam IR in the form of a pulse modulated optical signal can be transmitted towards the beam receiving unit 2 through the projector cover 10 covering the beam projecting unit 1.

The beam projecting unit 1 furthermore includes a signal receiving means (receiver) 13 for receiving a radio signal R transmitted wireless from the beam receiving unit 2, which signal R carries a request signal D indicative of a request to adjust the amount of beam projected, i.e., the beam projecting power, a request signal input circuit 14 for inputting the request signal D, and a beam projecting power adjustor 15 for controlling the drive circuit 12 in accordance with the request signal D to automatically adjust the beam projecting power of the beam projector 11. The beam projecting power adjustor 15 may be operated manually.

On the other hand, the beam receiving unit 2 includes the beam receiver 21, which is provided with a receiver optical system made up of a beam receiving lens or a beam collecting mirror (both not shown), and a beam receiving element such as a photodiode, and an optical axis adjusting mechanism (not shown) for adjusting the optical axis between the beam projector 11 and the beam receiver 21 as is the case with that in the beam projecting unit 1.

When the beam receiving element of the beam receiver 21 receives the infrared beam IR entering through the cover 20 covering the beam receiving unit 2, the beam receiver 20 outputs a received beam amount signal A indicative of the amount of the beam IR received. The received beam amount signal A is, after having been amplified by an amplifier 22, supplied to a detector 23, which in turn outputs a signal B proportional to the level of a pulse modulated light from which an external disturbing light component has been removed. This output signal B is then supplied to a determining circuit 24, where it is determined whether or not the level of the output signal B is lower than a predetermined intruder detection level. If the level of the output signal B is determined lower than the predetermined detection level, the determining circuit 24 provides a warning circuit 25 with a detection signal C indicative of the presence of an intruder within the alert area. In response to the detection signal C, the warning circuit 25 provides a security center 3 with a warning signal, calling an attention of the security center 3 that the intruder is found within the alert area.

The determination of the predetermined intruder detection level is made by, for example, identifying preset IDs each indicative of the certain level of the amount of the received beam, and determining the presence or absence of a pulse.

The beam receiving unit 2 employed in the present invention furthermore includes a received beam level processor 32 and a transmitter 33. The received beam level processor 32 is used to adjust the beam projecting power of the beam projector 11 and includes an analog-to-digital (A/D) converter 26, a received beam level detector 27, a level setting circuit 28, a proper range adjustor 29 and a request signal output circuit 30.

The received beam level detector 27 is used to detect the received beam level proportional to the received beam amount signal A through the A/D converter 26. The level setting circuit 28 is operable to set a proper range of the received beam level. The proper range adjustor 29 is used to adjust the proper range in accordance with time-based change of the received beam level, for example, in accordance with an average value of the received beam level every predetermined time width. This proper range adjustor 29 has an average value calculating circuit 41 and a level width setting circuit 42 both built therein. The average value calculating circuit 41 is operable to calculate the average value every predetermined time width, for example, every ten minutes, of the digital signals indicative of the received beam level. The level width setting circuit 42 is operable to set a predetermined level width (the proper range of the received beam level) with respect to the average value taken as a center value.

The request signal output circuit 30 is operable to output the request signal D requesting the adjustment of the beam projecting power when the received beam level departs from the proper range. The transmitter 33 transmits the request signal D wireless to the beam projecting unit 1 after the request signal D has been coded. The coded request signal D is transmitted to the beam projecting unit 1 being carried by, for example, a radio signal R. It is, however, to be noted that in place of the radio signal R, the coded request signal D may be carried by a modulated infrared beam IR or the like.

The adjustment of the beam projecting power accomplished by the security sensor system described above will now be described. The beam receiving unit 2, when receiving the infrared beam IR from the beam projecting unit 1, outputs the received beam amount signal A proportional to the amount of the infrared sensing beam IR received. This received beam amount signal A is, after having been amplified by the amplifier 22, supplied through the A/D converter 26 to the received beam level detector 27, which detects the received beam level. Then, the proper range adjustor 28 calculates an average value of the digital signals representative of the received beam level, supplied from the A/D converter 26, every predetermined time width of ten minutes and subsequently set a level predetermined width (the proper range of the received beam level) with respect to the calculated average value taken as a center value. In this way, the proper range of the received beam level can be changed up or down in accordance with the change in average value. The predetermined level width may be, for example, ±30% relative to the calculated average value. When the received beam level departs from the adjusted proper range of the received beam level, the request signal output circuit 30 outputs the request signal D requesting an adjustment of the projected beam amount. The transmitter 33 then codes the request signal D and transmits to the beam projecting unit 1 a radio signal R carrying the coded request signal D.

In the beam projecting unit 1, the receiver 13 receives the radio signal R carrying the request signal D requesting the adjustment of the beam projecting power and then provides the request signal input circuit 14 with the received request signal D. This request signal input circuit 14 in turn causes the projecting power adjustor 15 to control the drive circuit 12 in accordance with the request signal D to automatically adjust the beam projecting power of the beam projector 11. The beam projecting power of the beam projector 11 is thus optimally adjusted on a real time basis during the operation of the system through the received beam level adjustment performed in the beam receiving unit 2 and, therefore, the beam receiver 21 can be maintained at a proper received beam level as the beam receiver 21 receives the infrared beam IR of the adjusted beam projecting power.

Figure 3:
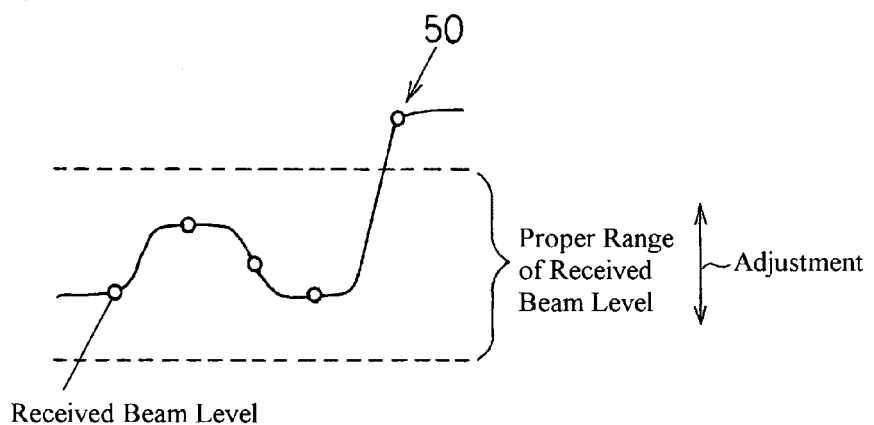
FIG. 3 is a chart showing the adjustment of the beam projecting power.
Figure 4:
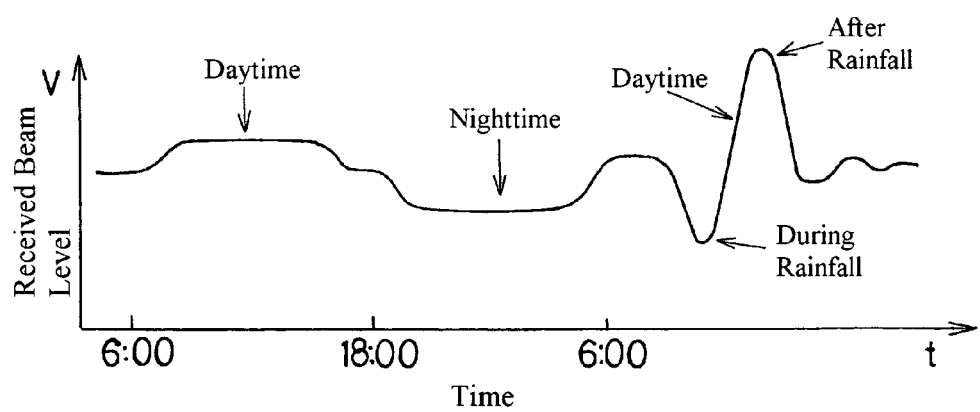
FIG. 4 is a chart showing a change of the beam receiving level with passage of time.

Referring to FIG. 3, the proper range of the received beam level varies with change of the received beam level (the average value) that varies with time and, in the event that the received beam level departs from the proper range, the beam projecting power is adjusted. For example, when the received beam level 50 is higher than the uppermost limit of the proper range, the beam projecting power is lowered to lower the received beam level. On the other hand, when the received beam level 50 is lower than the lowermost limit of the proper range, the beam projecting power is increased to increase the received beam level. In this way, since the received beam level can be maintained at a proper value at all times, even though the external environment changes with passage of time or even when the system is installed in the vicinity of a wall, it is possible to prevent the system from being adversely affected by the reflected beam IR and, hence, to avoid failure of the system to generate a warning signal or generation of an erroneous warning signal.

Also, unlike the conventional system, in which the beam projecting power is set to a relatively high level on one hand and the range of voltage inputted to the A/D converter 26 used for detecting the received beam level is set to a sufficiently large range, the present invention is such that the proper range of the received beam level is made variable with change of the average value so that the beam projecting power can be adjusted, in the event that the received beam level departs from the proper range, to thereby lower the peak value of the received beam level. Therefore, the dynamic range of the A/D converter 26 can be increased, resulting in increase of the resolving power and also the accuracy of detection of the received beam level.

As hereinbefore described, since in the present invention the proper range of the received beam level is adjusted with the change in time of the received beam level in such a way that in the event of departure of the received beam level from the proper range, the amount of the infrared beam IR projected from the beam projector 11 can be adjusted so that the received beam level can fall within the proper range. Accordingly, even though the external environment changes with passage of time, the received beam level can fall within the adjusted proper range and, hence, at all times during the operation of the system, the proper received beam level can be maintained without being adversely affected by the external environment and, also, without any limitation imposed on the place of installation, thus eliminating a possible failure to generate a warning signal or a possible generation of an erroneous warning signal. Also, the resolving power of the A/D converter 26 can advantageously be increased to thereby increase the accuracy of detection of the received beam level.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment the proper range adjustor 29 has been shown and described as operable to change the proper range in dependence with change in time of the received beam level, the present invention can work satisfactorily even though the proper range is fixed.

In addition, in describing the foregoing embodiment of the present invention, the sensing beam has been shown and described as employed in the form of an infrared beam, a microwave may be equally employed therefor.

Accordingly, such changes and modifications are, unless they depart from the scope of the present invention as delivered from the claims annexed hereto, to be construed as included therein.

What is claimed is:

1. A security sensor system for detecting an object when the latter intercepts passage of a sensing beam, which system comprises:
    a beam projecting unit including a beam projector for projecting the sensing beam and a drive circuit for driving the beam projector; and
    a beam receiving unit including a beam receiver for receiving the sensing beam,
    wherein the beam receiving unit also includes a received beam level detector for detecting a level of the sensing beam received, a level setting circuit for setting a proper range of the received beam level, a request signal output circuit for outputting a request signal requesting an adjustment of an amount of the sensing beam projected from the beam projector in the case that the received beam level departs from the proper range, and a transmitter for transmitting the request signal to the beam projecting unit; and
    wherein the beam projecting unit also includes a beam projecting power adjustor operable in response to the request signal from the beam receiving unit to drive the drive circuit to thereby adjust an amount of the sensing beam, projected from the beam projector, so that the received beam level can fall within the proper range.

2. The security sensor system as claimed in claim 1, further comprising a proper range adjustor for adjusting the proper range with change in time of the received beam level.

3. The security sensor system as claimed in claim 2, wherein the proper range adjustor adjusts the proper range based on an average value of the received beam level every predetermined time width.

4. The security sensor system as claimed in claim 3, wherein the proper range adjustor includes an average value calculator for calculating the average value of the received beam level and a level width setting circuit for setting a predetermined level width, corresponding to the proper range, with the average value taken as a center value.

* * * * *